United States Patent
Kim et al.

(10) Patent No.: US 10,330,056 B2
(45) Date of Patent: Jun. 25, 2019

(54) FUEL PUMP CONTROLLER INTEGRATED WITH AIR FILTER

(71) Applicants: HYUNDAI MOTOR COMPANY, Seoul (KR); KIA MOTORS CORPORATION, Seoul (KR)

(72) Inventors: Chang Han Kim, Gwangju (KR); Jong Ki Kim, Seongnam-si (KR); Jae Min Lee, Gongju-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/831,033

(22) Filed: Dec. 4, 2017

(65) Prior Publication Data
US 2019/0048834 A1    Feb. 14, 2019

(30) Foreign Application Priority Data
Aug. 10, 2017    (KR) .......................... 10-2017-0101693

(51) Int. Cl.
*F02M 31/04*    (2006.01)
*F02M 21/02*    (2006.01)
(Continued)

(52) U.S. Cl.
CPC ...... *F02M 31/042* (2013.01); *F02M 21/0221* (2013.01); *F02M 25/089* (2013.01); *F02M 35/0245* (2013.01); *F02M 35/02425* (2013.01); *F02M 35/02433* (2013.01); *F02M 37/0052* (2013.01)

(58) Field of Classification Search
CPC .. F02M 21/02; F02M 21/0221; F02M 25/089; F02M 31/04; F02M 31/042; F02M 35/02; F02M 35/02425; F02M 35/02433; F02M 35/0245; F02M 37/00; F02M 37/0052
USPC ........ 123/198 C, 198 E, 495, 497, 505, 509, 123/516, 573; 55/385.3, 385.7, 413, 495
See application file for complete search history.

(56) References Cited

U.S. PATENT DOCUMENTS 3,362,137 A * 1/1968 Richards ................ B01D 45/12
                                                          96/167
3,567,400 A * 3/1971 Shah .................. D21C 11/0057
                                                          159/15
(Continued)

FOREIGN PATENT DOCUMENTS

JP    H07-006463 B2    1/1995
JP    2005-539167 A    12/2005
(Continued)

*Primary Examiner* — Hung Q Nguyen
*Assistant Examiner* — Johnny H Hoang
(74) *Attorney, Agent, or Firm* — Morgan Lewis & Bockius LLP

(57) ABSTRACT

A fuel pump controller having an integrated air filter includes: a mounting plate fixed to a fuel tank; a motor driver provided on the mounting plate; an air filter having a filter sheet disposed inside a filter case to remove a foreign substance from air and having an air inlet port for air introduction; and an air outlet port for discharging the air, which has passed through the filter sheet. The filter case is integrally disposed on the mounting plate to enable heat exchange between the air passing therethrough and the motor driver.

11 Claims, 3 Drawing Sheets

(51) Int. Cl.
*F02M 35/024* (2006.01)
*F02M 25/08* (2006.01)
*F02M 37/00* (2006.01)

(56) References Cited

U.S. PATENT DOCUMENTS

| | | | |
|---|---|---|---|
| 6,865,080 B2 | 3/2005 | Radosevich et al. | |
| 6,868,834 B1 * | 3/2005 | Mitani | F02M 37/10 123/495 |
| 6,966,305 B2 * | 11/2005 | Aubree | F02M 37/103 123/497 |
| 7,314,040 B2 * | 1/2008 | Yagi | B60K 15/077 123/509 |
| 7,556,024 B2 * | 7/2009 | Crary | F02M 37/103 123/495 |
| 9,261,059 B2 * | 2/2016 | Schoenfuss | B60K 15/03 |
| 9,573,461 B2 * | 2/2017 | Sonderegger | B60K 15/035 |
| 2006/0081634 A1 * | 4/2006 | Moessinger | B01D 46/0001 220/371 |
| 2009/0044785 A1 * | 2/2009 | Maly | F02M 25/0818 123/519 |
| 2009/0183715 A1 * | 7/2009 | Yamamoto | F02M 37/0082 123/497 |
| 2009/0308034 A1 * | 12/2009 | Olson | B01D 46/0068 55/417 |
| 2012/0260616 A1 * | 10/2012 | Leister | H01M 8/04201 55/385.7 |
| 2014/0190522 A1 * | 7/2014 | Guglielmi | A47L 5/14 134/21 |
| 2015/0128539 A1 * | 5/2015 | Salpietra | B01D 53/0407 55/332 |
| 2016/0201622 A1 * | 7/2016 | Kreibig | F02M 37/0047 123/495 |
| 2017/0068160 A1 * | 3/2017 | Asada | G03F 7/0002 |

FOREIGN PATENT DOCUMENTS

| | | |
|---|---|---|
| JP | 2008-297904 A | 12/2008 |
| JP | 5939090 B2 | 6/2016 |

* cited by examiner

[FIG. 1]
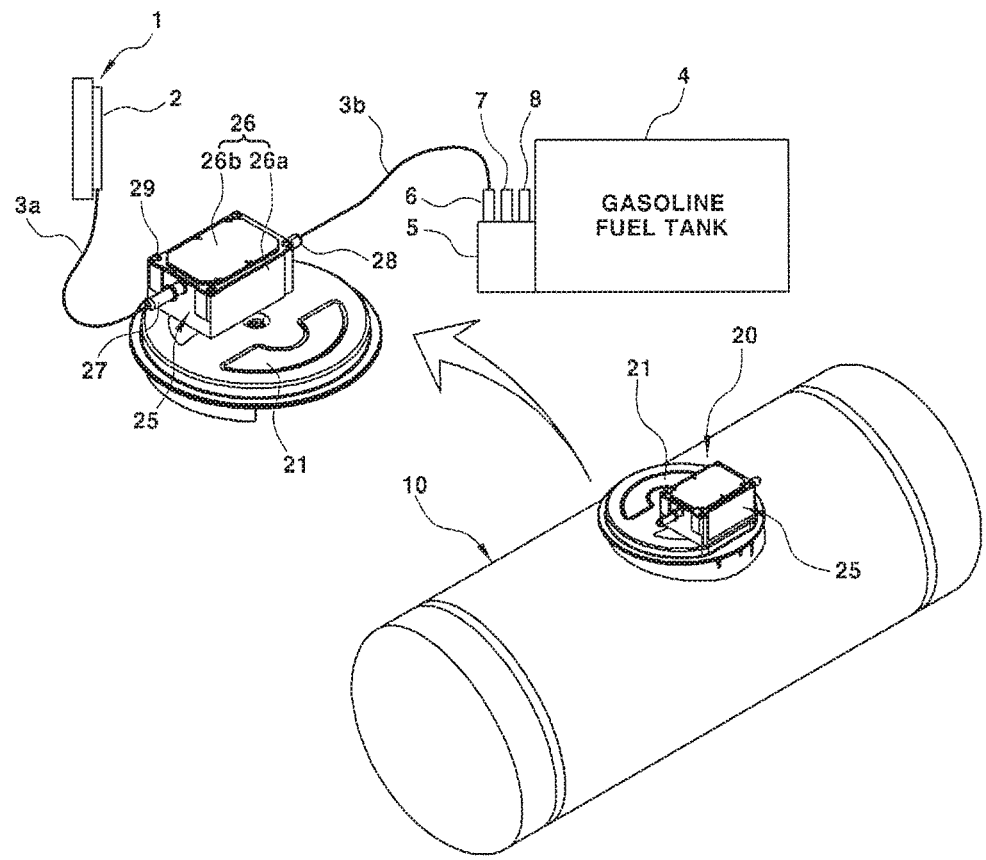
[FIG. 2]
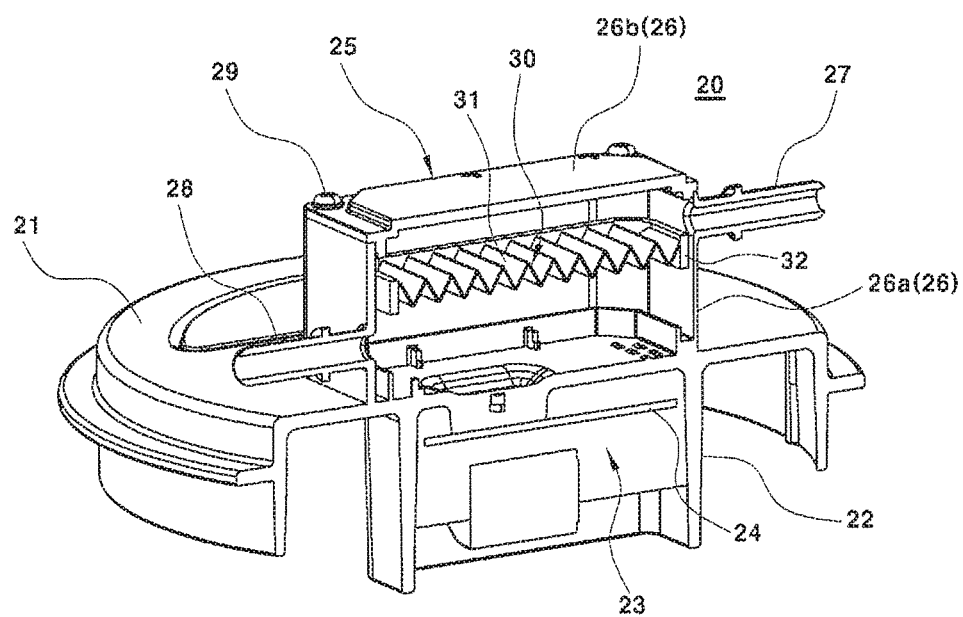

[FIG. 3]
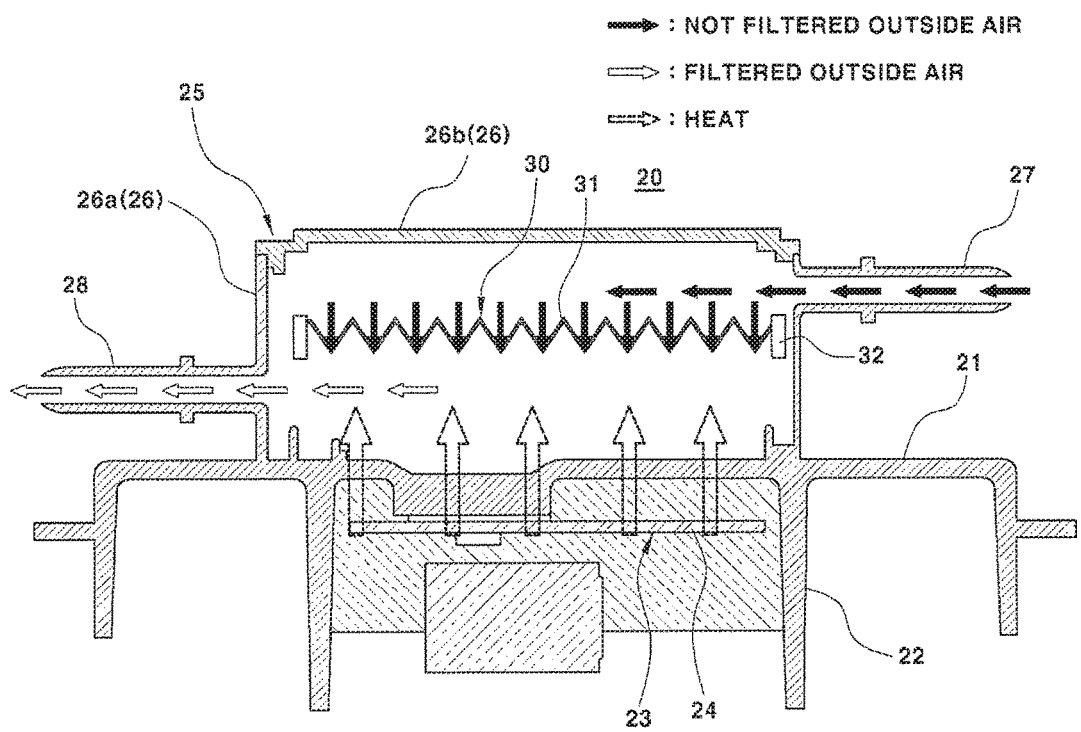
[FIG. 4]
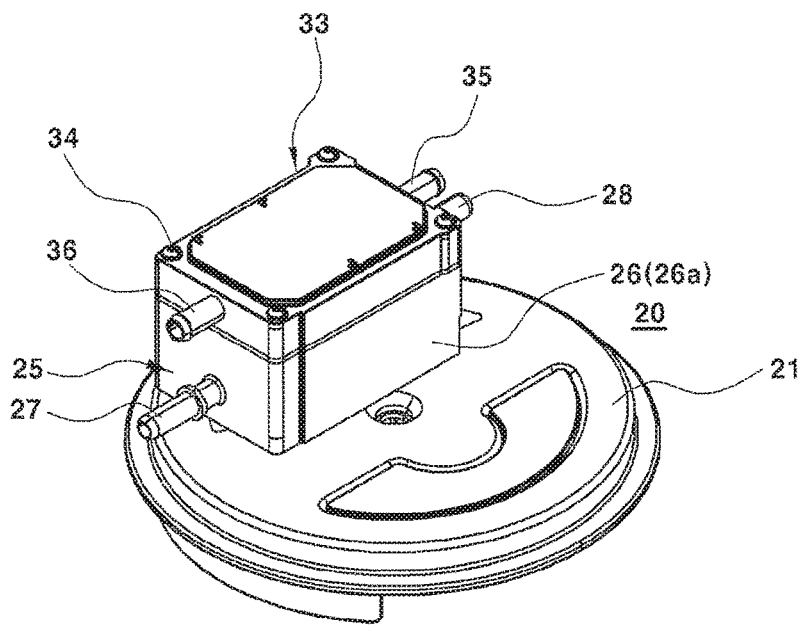

[FIG. 5]
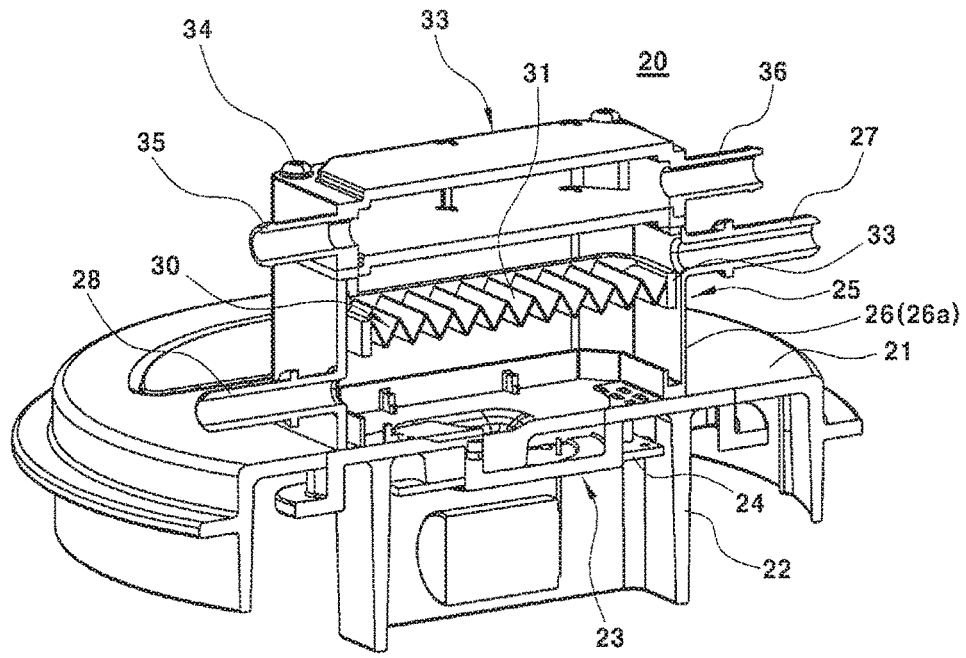
[FIG. 6]
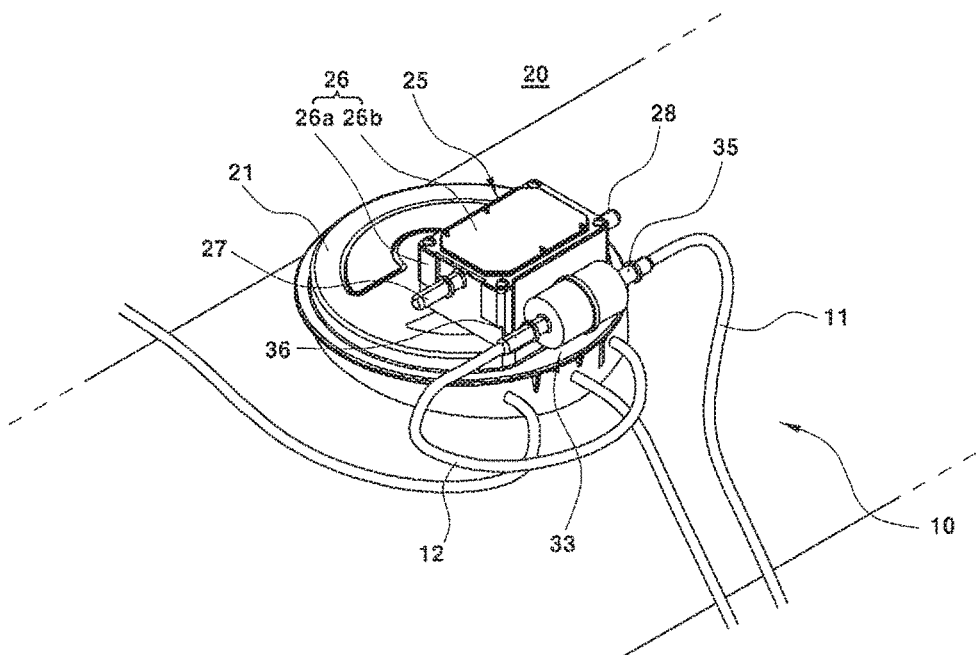

FUEL PUMP CONTROLLER INTEGRATED WITH AIR FILTER

CROSS-REFERENCE TO RELATED APPLICATION

This application claims under 35 U.S.C. § 119(a) the benefit of priority to Korean Patent Application No. 10-2017-0101693 filed on Aug. 10, 2017, the entire content of which is incorporated herein by reference.

TECHNICAL FIELD

The present disclosure relates to a fuel pump controller integrated with an air filter, and more particularly, to a fuel pump controller having an air-filter-integrated structure.

BACKGROUND

Generally, a vehicle fuel supply device includes a fuel tank in which fuel is stored, a fuel pump, which pumps the fuel stored in the fuel tank to supply the fuel to an engine, a fuel filter, which removes foreign substances included in the fuel to be supplied to the engine, and a fuel line, which transports the fuel.

As an example of the vehicle fuel supply device, a liquefied petroleum gas (LPG) vehicle that uses LPG fuel includes an LPG bombe, which corresponds to a fuel tank, and a fuel pump is mounted in the bombe to deliver the LPG fuel to the engine side.

Hereinafter, a further description will be made with respect to a liquefied petroleum injection (LPI) fuel supply device of the LPG vehicle. A conventional LPI fuel supply device basically includes, for example, an LPG bombe in which LPG fuel is stored, a fuel pump, which delivers the LPG fuel stored in the bombe, a controller for driving and controlling the fuel pump, a fuel supply line, which supplies the fuel delivered by the fuel pump to an injector of an engine, a fuel return line for collecting unused fuel from the engine and returning the same to the bombe, and a regulator valve provided on the fuel return line.

In the configuration described above, the bombe is usually mounted inside a trunk room in the LPG vehicle, and the fuel pump is mounted inside the bombe.

In the vehicular fuel supply device, the controller for driving and controlling the fuel pump may be provided on one side of the fuel tank, for example, on one side of the LPG bombe, and more particularly, may be provided on a mounting member, such as a flange, a fuel pump plate or a bracket, fixed on one side of the LPG bombe.

The fuel pump controller may include a motor driver for feedback control of the driving of the fuel pump (i.e. a pump motor), electric wires, and connectors, and the motor driver may have a configuration in which elements for driving the fuel pump, such as switching elements (e.g., FETs) and condensers, are mounted on a printed circuit board (PCB).

The motor driver drives and controls the pump motor upon receiving signals output from an electronic control unit (ECU) depending on engine operating conditions. For example, when the motor driver receives a pulse width modulation PWM signal, switching elements of an inverter are driven in response to the PWM signal to convert direct current into three-phase alternating current, and the pump motor is driven upon receiving the three-phase alternating current output from the motor driver.

At this time, the speed in revolutions per minute (RPM) of the pump motor may be controlled in several stages based on the PWM signal.

In the fuel pump controller, the connectors may include, for example, a power supply connector, a signal input/output connector, and a connector for outputting the three-phase alternating current converted by the switching elements of the inverter to the pump motor.

In the fuel supply device described above, the fuel pump controller may control the stepwise supply of fuel to the engine by adjusting a rotational speed (RPM) of the fuel pump based on the engine operating conditions. At this time, since the controller continuously consumes power, a large amount of heat is generated from, for example, the printed circuit board (PCB).

Therefore, although cooling is necessary to protect, for example, the internal circuit of the motor driver, the related art provides no cooling device to cool the controller, which deteriorates the durability of the controller.

Meanwhile, in order to prevent fuel loss and air pollution, the vehicle is provided with a canister, which collects and stores fuel evaporation gas generated from the fuel tank.

The canister is configured by filling a case having a predetermined volume with an absorbent material capable of absorbing hydrocarbons of fuel evaporation gas generated from the fuel tank (e.g. a gasoline fuel tank). Activated carbon is widely used as the absorbent material.

The activated carbon in the canister functions to adsorb a fuel component of the fuel evaporation gas introduced into the case, such as hydrocarbons.

While the engine stops, the fuel evaporation gas (more particularly, a fuel component such as hydrocarbons) is adsorbed onto the activated carbon in the canister. Then, when the engine is driven, the fuel evaporation gas adsorbed on the activated carbon is separated by the pressure of air suctioned from the outside. The separated fuel evaporation gas is supplied, along with the air, to an intake system of the engine.

An operation of supplying the fuel evaporation gas from the canister to the engine is generally referred to as a purge operation. The fuel evaporation gas generated from the fuel tank is collected in the canister and is then purged to the engine intake side via a purge control solenoid valve (PCSV) so as to burn in the engine during engine driving.

Now, the general configuration of the canister will further be described. The canister includes the case defining an inner space having a predetermined volume and filled with activated carbon, and the case has several ports, such as a purge port that is connected to the engine intake system for the discharge of the collected fuel evaporation gas to the engine side, a loading port that is connected to the fuel tank for the introduction of the fuel evaporation gas, and an air port that is connected to an air filter for the suction of air.

In addition, the case includes a partition formed in the inner space thereof to separate a space in which the air port is located from a space in which the purge port and the loading port are located. As the fuel evaporation gas introduced through the loading port passes through the inner space divided by the partition, hydrocarbons, which are a fuel component, are adsorbed onto the activated carbon.

When the PCSV, which is controlled by the ECU, is opened during engine driving so that a suction pressure, i.e. a negative engine pressure is applied from the engine side to the inner space of the canister through the purge port, air is suctioned through the air filter and the air port, and the fuel evaporation gas and the hydrocarbons, which are separated from the activated carbon by the air, are discharged through the purge port to thereby be introduced into the engine.

For such a purge operation of causing the air to be suctioned into the canister and causing the fuel component, such as hydrocarbons, to be separated from the activated carbon inside the canister by the suctioned air to thereby be suctioned, along with the fuel evaporation gas, into the engine, the negative engine pressure needs to be applied to the canister through a purge line and the purge port.

However, in the interests of improved fuel efficiency, the number of engine purge operations tends to be decreased, and in particular, in the case of a continuously variable valve lift (CVVL) engine or an HEV/PHEV engine, the number of purge operations must be reduced due to a reduction in the engine negative-pressure area.

In the related art, since there is no solution to increase purge efficiency despite a reduction in the number of purge operations and no external energy is applied to increase purge efficiency, purge efficiency is poor and has difficulty in satisfying evaporation gas regulations.

Therefore, there is an urgent demand for a solution to increase the efficiency of a purge operation in consideration of the reduction in the number of engine purge operations.

In addition, in the related art, the canister air filter has been separately mounted on a specific position of the vehicle, such as a filler neck, and, for example, a bracket or some other fastening member is required to fix the air filter to the filler neck, which increases the number of elements and the production costs.

SUMMARY OF THE DISCLOSURE

The present disclosure is devised to solve the problems described above, and an object of the present disclosure is to provide a fuel pump controller having an integrated air filter, which enables the efficient recycling of heat dissipated upon cooling by which heat generated from a circuit board of a motor driver is dissipated outward, which may maximize the purge efficiency of a canister, and which enables a reduction in the number of elements and in the production costs.

In one aspect, a fuel pump fuel pump controller having an integrated air filter includes: a mounting plate fixed to a fuel tank, a motor driver provided on the mounting plate; an air filter having a filter sheet is provided inside a filter case to remove a foreign substance from air; an air inlet port for introduction of the air into the filter case; and an air outlet port for discharge of the air, which has passed through the filter sheet in the filter case to remove the foreign substance from the air filter. The filter case is integrally disposed on the mounting plate to enable heat exchange between the air passing therethrough and the motor driver.

The fuel tank may be a liquefied petroleum gas (LPG) bombe, and the fuel pump may be an LPG fuel pump provided in the LPG bombe.

The mounting plate may be provided to hermetically seal an opening in the fuel tank, the mounting plate may include an accommodating portion formed in an inner surface thereof that faces an inside of the fuel tank, the motor driver may be accommodated in the accommodating portion, and the filter case may be integrally disposed on an outer surface of the mounting plate that is located outside the fuel tank so as to enable the heat exchange between the air passing through the filter case and the motor driver.

The filter case may include a case body integrally formed with the mounting plate so that the filter sheet is provided therein and having an opening, and a cover coupled to the case body so as to cover the opening in order to hermetically seal an inner space of the case body.

The air outlet port of the filter case may be connected to an air port of a canister, which collects fuel evaporation gas, via a tube so that the air inside the air filter is suctioned into the air port through the air outlet port and the tube during a purge operation of the canister so as to enable separation of the fuel evaporation gas inside the canister.

The filter sheet may be horizontally disposed inside the filter case so as to vertically divide an inner space of the filter case.

The mounting plate may include an integrally formed accommodating portion in which the motor driver is accommodated, and at least a portion of the mounting plate may be configured to separate an inner space of the filter case from an inner space of the accommodating portion and to form a boundary between both the inner spaces.

The fuel pump controller may further include a heat exchange case having a fuel inlet port for introduction of fuel returned from an engine and a fuel outlet port for discharge of the fuel, which has passed through the heat exchange case, and the heat exchange case may be coupled to the air filer so as to enable heat exchange between the fuel passing through the heat exchange case and the air passing through the air filter.

The heat exchange case may be coupled so as to be stacked on a top of the filter case of the air filter.

The filter case may be integrally formed with the mounting plate so as to have an opening, and the heat exchange case may be coupled to the opening so as to hermetically seal an inner space of the filter case.

The filter case may have the opening in a top thereof, and the heat exchange case may be coupled in a manner of being stacked on the top of the filter case so that a lower surface of the heat exchange case covers the opening in the filter case.

The fuel returned from the engine may be LPG fuel, the fuel inlet port and the engine may be connected to each other via a fuel return line so as to enable introduction of the LPG fuel returned from the engine, and the fuel outlet port and an LPG bombe may be connected to each other via the fuel return line so as to allow the LPG fuel, which has passed through the heat exchange case, to be returned to the LPG bombe.

The heat exchange case may have a chamber shape.

At least a portion of an outer surface of the heat exchange case having a chamber shape may be in contact with the air filter.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a perspective view illustrating the installed state of a fuel pump controller having an integrated air filter according to an embodiment of the present disclosure;

FIG. 2 is a cross-sectional perspective view of the fuel pump controller having the integrated air filter according to the embodiment of the present disclosure;

FIG. 3 is a cross-sectional view of the fuel pump controller having the integrated air filter according to the embodiment of the present disclosure;

FIG. 4 is a perspective view illustrating the fuel pump controller having the integrated air filter according to another embodiment of the present disclosure;

FIG. 5 is a cross-sectional perspective view illustrating the fuel pump controller having the integrated air filter according to the embodiment illustrated in FIG. 4; and FIG. 6 is a perspective view illustrating the fuel pump controller having the integrated air filter according to a further embodiment of the present disclosure.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, the exemplary embodiments of the present disclosure will be described in detail with reference to the accompanying drawings so as to allow those skilled in the art to easily practice the same. However, the present disclosure is not limited to the embodiments described herein, but may be realized in other forms.

Throughout the specification, when any portion is said to "include" any element, this means that the portion may further include other elements, rather than precluding the presence of other elements, unless otherwise mentioned.

The present disclosure is intended to provide a fuel pump controller having an integrated air filter, which enables the efficient recycling of heat dissipated upon cooling by which heat generated from a circuit board of a motor driver is dissipated outward, which may maximize the purge efficiency of a canister, and which enables a reduction in the number of elements and in the production costs.

The fuel pump controller (hereinafter abbreviated as "controller") according to the present disclosure has a feature of including an integrated cooling device, which absorbs heat generated from a heat-emitting element such as a circuit board of a motor driver in order to cool the heat-emitting element.

The cooling device is provided to discharge the heat generated from the circuit board or the like during controller operation to the outside of the controller. In an embodiment of the present disclosure, the cooling device may be an air filter, through which cold atmospheric air suctioned into a canister passes.

That is, the heat-emitting element of the controller may be cooled through heat exchange between the cold air, which has been suctioned from the atmosphere and has passed through the inside of the air filter, and the heat-emitting element of the controller.

To this end, the air filter and the controller may integrally configure a module, and the modulated controller having the integrated air filter may be provided on a mounting plate fixed to a fuel tank (e.g. an LPG bombe).

When the cold atmospheric air undergoes heat exchange with the controller while passing through the air filter, the air filter may absorb the heat generated from the controller to thereby cool the controller. At this time, the air passing through the air filter may be heated by the heat transferred from the controller.

When the heated air is suctioned into the canister through an air port, purge operation efficiency, i.e. purge efficiency using the canister may be increased due to the application of external thermal energy.

When the air filter and the controller integrally configure a module to enable heat exchange therebetween as described above, both controller cooling efficiency and purge efficiency may be increased, and waste heat, which has been discarded away without being used after being generated from the controller, may be recycled as thermal energy to heat the air suctioned into the canister.

The fuel pump controller having the integrated air filter according to the present disclosure may be applied to a bi-fuel vehicle, and may be provided on an LPG bombe.

Hereinafter, the configuration of the fuel pump controller having the integrated air filter according to the embodiments of the present disclosure will be described in detail.

FIG. 1 is a perspective view illustrating the installed state of the fuel pump controller having the integrated air filter according to an embodiment of the present disclosure, and FIG. 2 is a cross-sectional perspective view of the fuel pump controller having the integrated air filter according to the embodiment of the present disclosure.

FIG. 3 is a cross-sectional view of the fuel pump controller having the integrated air filter according to the embodiment of the present disclosure.

The fuel pump controller having an integrated air filter according to the embodiment of the present disclosure, designated by reference numeral 20, may be applied to a bi-fuel vehicle, which uses both gasoline fuel and LPG fuel. Such a bi-fuel vehicle is equipped with a gasoline fuel supply system and an LPG fuel supply system.

That is, the bi-fuel vehicle is equipped with both a gasoline fuel tank 4 and an LPG bombe 10, which is an LPG fuel storage tank, and gasoline fuel and LPG fuel (not illustrated) are respectively stored inside the gasoline fuel tank 4 and the LPG bombe 10.

The gasoline fuel supplied from the gasoline fuel tank 4 to the engine wholly burns without returning to the gasoline fuel tank 4, whereas unburned LPG fuel among LPG fuel supplied from the LPG bombe 10 to the engine returns to the LPG bombe 10 through a fuel return line, although this is not illustrated in the drawings.

The gasoline fuel tank 4 is equipped with a canister 5, which collects fuel evaporation gas generated in the fuel tank and then delivers the collected fuel evaporation gas to the engine intake side during a purge operation. The configuration of the canister 5 has no difference from that of the related art.

In addition, unlike the related art, in which an air filter is mounted on a filler neck 1, an air filter 25 is integrated with the fuel pump controller 20, which is provided on the LPG bombe 10, so as to constitute a module along with the fuel pump controller 20.

Thus, the fuel pump controller 20 according to the embodiment of the present disclosure is an LPG fuel pump controller 20 provided on the LPG bombe 10 in the bi-fuel vehicle and serves to drive and feedback-control an LPG fuel pump (pump motor) (not illustrated) provided in the LPG bombe 10.

As illustrated in FIG. 1, the fuel pump controller 20 (hereinafter abbreviated as "controller") according to the embodiment of the present disclosure is provided on a mounting plate 21, which is fixed on one side of the LPG bombe 10, and the mounting plate 21 is manufactured in a plate shape so as to hermetically seal an opening (not illustrated) formed in one side of the LPG bombe 10.

In an embodiment of the present disclosure, the controller 20 may be configured such that a motor driver 23 is accommodated in an accommodating portion 22 of the mounting plate 21, and the accommodating portion 22 may be integrally formed in the mounting plate 21.

The mounting plate 21 is a plate-shaped member, which serves as a base plate on which a motor driver 23 of the controller 20 is fixed and on which the air filter 25 is integrally disposed. The mounting plate 21 is used to hermetically seal the opening in the LPG bombe 10 and to integrally interconnect the controller 20 including the motor driver 23 and the air filter 25.

In an embodiment of the present disclosure, the accommodating portion 22 into which the motor driver 23 is inserted and accommodated may be formed in the lower surface of the mounting plate 21 based on the drawings, that is, in the lower surface of the mounting plate 21 that faces the inside of the LPG bombe 10 in the state in which the mounting plate 21 is mounted in the opening in the LPG bombe 10.

The motor driver 23 may have a configuration in which elements for driving a fuel pump, such as switching elements (e.g. FETs) and condensers, are mounted on a printed circuit board (PCB) 24.

In addition, the air filter 25, which is integrally formed with the controller 20, includes a filter case 26, which is integrally disposed on the mounting plate 21 so as to allow air to pass through the inner space thereof, and a filter sheet 30, which is disposed in the inner space of the filter case 26 to remove foreign substances in the air.

In an embodiment of the present disclosure, the filter case 26 is configured to define a hermetically sealed inner space therein and is integrally fixed to and disposed on the outer surface of the mounting plate 21 located outside the LPG bombe 10, that is, the upper surface of the mounting plate 21 based on the drawings.

As illustrated in FIG. 2, the filter case 26 may include a case body 26a integrally formed on the outer surface of the mounting plate 21 to have the inner space therein and a cover 26b separably assembled to an opening in the top of the case body 26a so as to hermetically seal the inner space of the case body 26a.

In an embodiment of the present disclosure, the filter case 26 may have a rectangular case shape on the mounting plate 21, as illustrated in FIG. 1. Thus, the case body 26a may have a rectangular inner space therein and may be configured so as to be opened at the top thereof.

At this time, a portion of the upper surface of the mounting plate 21 forms the bottom surface of the inner space of the filter case 26. Similarly, a portion of the lower surface of the mounting plate 21 forms a roof surface of the inner space of the accommodating portion 22.

In this structure, the inner space of the filter case 26 (i.e. the case body 26a) and the inner space of the accommodating portion 22 are completely spatially separated from each other by a portion of the mounting plate 21.

That is, the filter case 26 and the accommodating portion 22 are spatially separated from each other with a portion of the mounting plate 21 interposed therebetween. At this time, a portion of the mounting plate 21 spatially separates the filter case 26 (i.e. the case body 26a) from the accommodating portion 22, forms the boundary between both the inner spaces, and forms both the bottom surface of the case body 26a and the roof surface of the accommodating portion 22. In addition, a portion of the mounting plate 21, which forms the boundary between the filter case 26 and the accommodating portion 22, serves as a heat transfer path. The heat generated from the controller 20 may be transferred to the air filter 25 through a portion of the mounting plate 21, which serves as the boundary.

That is, a portion of the mounting plate 21 transfers heat from the motor driver 23 to the inside of the air filter 25. The heat generated from the motor driver 23 is transferred to the air passing through the inner space of the air filter 25 via a portion of the mounting plate 21.

Thereby, the motor driver 23 may be cooled, and the air introduced into the air filter 25 may be heated and raised in temperature upon receiving the heat generated from the controller 20 while passing through the inner space of the air filter 25.

The cover 26b may be coupled and fixed to the upper end of the case body 26a to cover the opening in the top of the case body 26a. Here, the cover 26b may be bolted to the case body 26a.

That is, after the cover 26b is placed on the upper end of the case body 26a to hermetically seal the inner space of the case body 26a, a bolt 29 is inserted into a fastening hole (not illustrated) formed in the cover 26b from the upper side so as to penetrate the cover 26b, thereby fastening the cover 26b to the case body 26a.

Once the cover 26b has been assembled as described above, the inner space of the case body 26a, i.e. the inner space of the filter case 26 is completely hermetically sealed so as to prevent the leakage of air.

In addition, the filter sheet 30 is fixed in the inner space of the air filter 25, i.e. in the inner space of the filter case 26, which is hermetically sealed when the case body 26a and the cover 26b are assembled and fastened with each other.

The filter sheet 30 may include a filtering sheet 31, which removes foreign substances in the air passing therethrough, and a frame 32, which fixes and supports the filtering sheet 31 while being coupled to the inner surface of the air filter 25 (i.e. the inner surface of the filter case 26).

In this configuration, the filtering sheet 31 may be integrated with the frame 32 by being coupled and fixed at the edge portion thereof to the frame 32. Thus, the filter sheet 30 may have a configuration in which the frame 32 is disposed along the edge portion of the filtering sheet 31, or may have a configuration in which the filtering sheet 31 is integrally coupled inside the rectangular frame 32.

The frame 32 may be assembled to the inner side surface of the filter case 26 by being seated on a holding protrusion (not illustrated) formed on the inner side surface of the filter case 26, by being fitted into a fitting portion formed in the inner side surface of the filter case 26, or by being coupled at a fixed position.

In an embodiment of the present disclosure, as illustrated, the filter sheet 30 may be horizontally disposed so as to vertically divide the inner space of the air filter 25.

That is, the filter sheet 30 is horizontally disposed inside the case body 26a, which constitutes the filter case 26, so as to vertically divide the inner space of the air filter 25 (i.e. the inner space of the filter case 26).

To this end, the frame 32 of the filter sheet 30 is provided on the inner side surface of the case body 26*a* at a height at which the frame 32 may vertically divide the inner space, whereby the filter sheet 31 vertically divides the inner space of the filter case 26.

The space above the filter sheet 31 of the filter sheet 30 may serve as an upstream side space, and the space below the filter sheet 31 may serve as a downstream side space, on the basis of the direction in which air passes and the air flow direction.

That is, after the air is introduced into the space above the filter sheet 31 in the inner space of the air filter 25, the air passes through the filter sheet 31 so as to enable the removal of foreign substances therefrom and then moves to the space below the filter sheet 31. Thereafter, the air is discharged from the space below the filter sheet 31 to the outside of the air filter 25.

The filter case 26 of the air filter 25 has an air inlet port 27 and an air outlet port 28 on one side and the other side thereof respectively so that air is introduced into the inner space and thereafter is discharged therefrom. As illustrated, the air inlet port 27 and the air outlet port 28 may be formed in one side and the other side of the case body 26*a*.

The air inlet port 27 and the air outlet port 28 are provided in two regions of the inner space of the air filter 25, which are divided by the filter sheet 31 of the filter sheet 30. In the filter case 26, among the two regions divided by the filter sheet 31, the air inlet port 27 communicates with the upstream side space and the air outlet port 28 communicates with the downstream side space.

In the illustrated example, the air inlet port 27 may be formed in the upper portion of the filter case 26 to communicate with the upper space, which is the upstream side space, of the inner space of the air filter 25, and the air outlet port 28 may be formed in the lower portion of the filter case 26 to communicate with the lower space, which is the downstream side space.

Thus, the air, which is introduced into the upper inner space of the air filter 25 through the air inlet port 27, passes through the horizontally disposed filter sheet 31 to thereby move to the lower inner space of the air filter 25. The air, from which foreign substances have been removed while passing through the filter sheet 31, may be discharged from the lower inner space of the air filter 25 to the outside of the air filter 25 through the air outlet port 28.

The air inlet port 27 is connected to an air inlet portion 2 provided on the filler neck 1 via a tube 3*a*, and the air outlet port 28 is connected to an air port 6 of the canister 5 via a tube 3*b*.

Thus, during a purge operation, the atmospheric air is suctioned through the air inlet portion 2 of the filter neck 1 and is introduced into the air filter 25 through the tube 3*a* and the air inlet port 27. The air, from which foreign substances have been removed while passing through the filter sheet 30 inside the air filter 25, is discharged through the air outlet port 28 and is then supplied to the air port 6 of the canister 5 via the tube 3*b*.

In conclusion, during the purge operation, in the canister 5, fuel evaporation gas adsorbed on activated carbon is separated by the pressure of the air suctioned via the air filter 25 to thereby be supplied, along with the air, to an engine intake system and thereafter burns in the engine during engine driving.

In the purge operation described above, the air is heated and raised in temperature upon receiving heat generated from the controller 20 while passing through the air filter 25. At this time, the controller 20 is cooled by cold air passing through the air filter 25.

Since the temperature of the air suctioned into the canister 5 may be raised during the purge operation using waste heat generated in the controller 20, in the canister 5, separation of a fuel component from the activated carbon may be easily performed by the air having a raised temperature, with the result that separation efficiency and purge efficiency may be increased by the heated air.

In addition, in the case of the controller 20, improved circuit protection and increased durability may be achieved since the controller 20 may be cooled by cold air passing through the air filter 25.

In addition to the purge operation, when excessive negative pressure is formed in the fuel tank, outside air may be introduced through the air filter 25. Even in this case, protection of the fuel supply device is possible since the introduced outside air is filtered while passing through the air filter 25.

The filter sheet 30 needs to be replaced at a predetermined interval since it may be contaminated via accumulation of foreign substances after being used for a certain period.

Upon replacement of the filter sheet 30, after the cover 26*b* is separated by unfastening the bolt 29, the filter sheet 30 is removed from the case body 26*a*. Then, a new filter sheet 30 is installed inside the se body 26*a*, and the cover 26*b* is again fastened to the case body 26*a* so as to close the case body 26*a*.

Although the entire air filter including the case needs to be replaced in the related art, as described above, in the present disclosure, only the filter sheet 30 provided inside the filter case 26 needs to be replaced, which may reduce maintenance costs compared to the related art.

In an embodiment of the present disclosure, since the filter case 26, in particular, the case body 26*a* is integrally formed with the mounting plate 21, the manufacture of a separate air filter case may be unnecessary, and, for example, a separate bracket or fastening member for fixing or fastening the air filter to a predetermined position inside the vehicle (in the related art, at a predetermined position on the filler neck) may be unnecessary, which enables a reduction in the number of elements and in the production costs.

FIG. 4 is a perspective view illustrating the fuel pump controller having an integrated air filter according to another embodiment of the present disclosure, and FIG. 5 is a cross-sectional perspective view illustrating the fuel pump controller having the integrated air filter according to the embodiment illustrated in FIG. 4.

The illustrated embodiment provides a double heat exchange structure, unlike the embodiment of FIGS. 1 to 3.

As illustrated, the fuel pump controller 20 having the integrated air filter, which includes a double heat exchange structure, further includes a heat exchange case 33, through which fuel returned from the engine to the LPG bombe (reference numeral 10 in FIG. 1) passes.

The heat exchange case 33 is manufactured to have a sealed inner space having a predetermined volume.

A fuel inlet port 35 for the introduction of LPG fuel is formed in one side of the heat exchange case 33, and a fuel outlet port 36 for the discharge of LPG fuel is formed in the other side of the heat exchange case 33.

The fuel inlet port 35 is connected to the engine via a tube of the fuel return line, and the fuel outlet port 36 is connected to the LPG bombe (reference numeral 10 in FIG. 1) via a tube of the fuel return line.

That is, the LPG fuel returned from the engine is introduced into the inner space of the heat exchange case 33 via the fuel inlet port 35, and the returned LPG fuel, which has passed through the inner space of the heat exchange case 33, is discharged through the fuel outlet port 36 and flows to the LPG bombe via the fuel return line.

In an LPG system, LPG fuel, which remains after being sprayed in a liquid phase from the engine, is returned to the LPG bombe. The LPG fuel returned from the engine to the LPG bombe is in a high-temperature state.

Since the temperature inside the LPG bombe is raised when the LPG fuel returned to the LPG bombe has a high temperature, chargeability may be reduced in hot weather such as during the summer when the bombe is charged with fuel, and charging of fuel may be impossible.

Therefore, it is necessary to cool the returned fuel as well as the motor driver 23 of the controller 20. When the returned fuel is cooled to have a lowered temperature, the chargeability of LPG fuel in hot weather may be increased.

Thus, in the embodiment of FIGS. 4 and 5, the returned fuel as well as the motor driver 23 of the controller 20 may be cooled using cold air passing through the air filter 25, and heat exchange between the fuel inside the heat exchange case 33 and the air inside the air filter 25 may be realized.

The fuel pump controller 20 having the integrated air filter illustrated in FIGS. 4 and 5 has a double heat exchange structure capable of realizing both heat exchange between the air inside the air filter 25 and the controller 20 and heat exchange between the air inside the air filter 25 and the returned LPG fuel inside the heat exchange case 33.

In the embodiment of FIGS. 4 and 5, in addition to the cooling of the controller and the returned fuel, the air suctioned into the canister (reference numeral 5 in FIG. 1) may be heated and raised in temperature using thermal energy discarded from the controller and the returned fuel, whereby the durability of the controller may be increased via cooling, an increase in the temperature inside the LPG bombe may be minimized via the cooling of the returned fuel, and the purge efficiency of the canister may be increased.

In particular, since the cold air introduced into the air filter 25 is heated and raised in temperature upon receiving heat of the returned high-temperature LPG fuel as well as the heat of the motor driver 23, the purge efficiency of the canister may be greatly increased.

In an embodiment of the present disclosure, the heat exchange case 33 may be manufactured using a material that transfers heat well, i.e. a metal material having high thermal conductivity, and may be manufactured using, for example, an aluminum alloy.

In addition, the inner space of the heat exchange case 33 may be formed as a completely sealed space to prevent the fuel returned from the engine from leaking while passing therethrough, and the outer surface of the heat exchange case 33 may be brought into contact with the air inside the air filter 25 (the air inside the filter case 26) or the outer surface of the filter case 26 to enable heat exchange between the fuel therein and the air inside the air filter 25.

In an embodiment of FIGS. 4 and 5, the filter case 26 may be integrally formed on the upper surface (outer surface) of the mounting plate 21 so as to have an open top side, i.e. to have an opening in the top thereof. At this time, the heat exchange case 33 may be assembled in a manner of being stacked on the filter case 26.

The heat exchange case 33 may be assembled by being directly stacked over the opening in the top of the filter case 26, and in the assembled state, the lower surface of the heat exchange case 33 covers the opening to hermetically seal the inner space of the filter case 26.

That is, the heat exchange case 33 may be assembled so as to be stacked on the top of the case body 26a. With this assembly structure, instead of the cover 26b in the embodiment of FIGS. 1 to 3, the heat exchange case 33 is disposed on the upper side of the case body 26a.

At this time, after the heat exchange case 33 is placed on the upper end of the case body 26a, the heat exchange case 33 may be fastened and fixed to the case body 26a using a bolt 34, similar to the fastening of the cover.

Even in this case, after the heat exchange case 33 is separated from the case body 26a, it may be necessary to replace only the filter sheet 30 inserted into the case body 26a.

Meanwhile, FIG. 6 is a perspective view illustrating the fuel pump controller having the integrated air filter according to a further embodiment of the present disclosure. Although the embodiment of FIG. 6 has a double heat exchange structure in the same manner as the embodiment of FIGS. 4 and 5, the heat exchange case 33 is provided as a separate chamber.

Referring to FIG. 6, the LPG fuel returned along a tub 11 of the fuel return line is introduced into the heat exchange case 33 via the fuel inlet port 35, and the LPG fuel, which has undergone heat exchange with the air inside the air filter 25 while passing through the inside of the heat exchange case 33, is discharged from the heat exchange case 33 via the fuel outlet port 36 and moves into the LPG bombe 10 along a tube 12 of the fuel return line.

As illustrated, the heat exchange case 33 in the form of a separate chamber may be provided around the air filter 25 to realize heat exchange between the air and the returned LPG fuel, and at least a portion of the outer surface of the heat exchange case 33 may be brought into contact with the filter case 26 of the air filter 25.

Here, as illustrated in FIG. 6, the heat exchange case 33 may be attached so as to be in contact with the side surface of the air filter 25. Although not illustrated in detail in FIG. 6, the heat exchange case 33 may be mounted on the side surface of the air filter 25 via an assembly method, by which the two may be integrally fixed to each other in a contact manner, such as fitting.

At this time, the filter case 26 of the air filter 25 takes the form of an assembly of the case body 26a and the cover 26b, and the heat exchange case 33 may have a rectangular case shape, but may alternatively have a cylindrical shape as illustrated in FIG. 6.

In the same manner as the above description of the embodiment of FIGS. 4 and 5, the fuel inlet port 35 and the fuel outlet port 36 are provided on one side and the other side of the heat exchange case 33, the LPG fuel returned from the engine is introduced into the heat exchange case 33 via the fuel inlet port 35 and thereafter is returned to the LPG bombe 10 via the fuel outlet port 36, the LPG fuel undergoes heat exchange with the air inside the air filter 25 while passing through the heat exchange case 33, and the air passing through the air filter 25 is heated by the LPG fuel inside the heat exchange case 33 and thereafter is supplied to the canister.

As is apparent from the above description, with a fuel pump controller having an integrated air filter according to the present disclosure, since the temperature of air suctioned into a canister during a purge operation may be raised using waste heat generated from the controller, a fuel component may be easily separated from activated carbon by the air having the raised temperature inside the canister, with the result that separation efficiency and purge efficiency may be increased by the heated air.

In the case of the controller, improved circuit protection and increased durability may be achieved since the controller may be cooled by cold air passing through the air filter.

In addition to the purge operation, when excessive negative pressure is formed in a fuel tank, outside air may be introduced through the air filter. Even in this case, protection of the fuel supply device is possible since the introduced outside air is filtered while passing through the air filter.

In addition, since a filter case, in particular, a case body is integrally formed with a mounting plate 21, the manufacture of a separate air filter case may be unnecessary and, for example, a separate bracket or fastening member for fixing or fastening the air filter to a predetermined position inside the vehicle (in the related art, at a predetermined position on the filler neck) may be unnecessary, which enables a reduction in the number of elements and in the production costs.

In addition, LPG fuel returned to an LPG bombe may be cooled by the air passing through the air filter, which may minimize an increase in the temperature inside the LPG bombe, which ensures high fuel chargeability even in hot weather such as during the summer.

In addition, since the temperature of air suctioned into the canister may be raised using heat of the returned LPG fuel, purge efficiency may be increased.

The invention has been described in detail with reference to preferred embodiments thereof. However, it will be appreciated by those skilled in the art that the present disclosure may be implemented in various modifications and alterations via, for example, addition, change or omission of constituent elements without departing from the principles and spirit of the invention, and these modifications and alterations are included in the scope of the present disclosure.

In addition, in the description of the embodiments of the present disclosure, a detailed description of known functions and configurations incorporated herein is omitted when it may make the subject matter of the present disclosure rather unclear. In addition, the terms used in the above description are defined in consideration of the functions in the embodiments of the present disclosure, and may be replaced by other terms based on intentions of users or operators, customs, or the like. Hence, the meanings of these terms should be based on the whole content of this specification. Accordingly, the above detailed description of the present disclosure is not intended to limit the present disclosure by the disclosed embodiments, and the accompanying claims should be construed as including other embodiments.

What is claimed is:

1. A fuel pump controller comprising:
a mounting plate fixed to a fuel tank;
a motor driver, which is configured to drive a fuel pump, disposed on the mounting plate; and
an air filter including:
a filter sheet inside a filter case to remove a foreign substance from air;
an air inlet port for introduction of the air into the filter case; and
an air outlet port for discharge of the air, which has passed through the filter sheet in the filter case to remove the foreign substance,
wherein the mounting plate includes an accommodating portion in which the motor driver is accommodated,
wherein at least a portion of the mounting plate includes a boundary which separates an inner space of the filter case from an inner space of the accommodating portion, and
wherein the filter case is integrally disposed on the mounting plate to enable heat exchange between the air passing through the filter case and the motor driver through the boundary of the mounting plate.

2. The fuel pump controller of claim 1, wherein the fuel tank is a liquefied petroleum gas (LPG) bombe, and the fuel pump is an LPG fuel pump of the LPG bombe.

3. The fuel pump controller of claim 1, wherein the mounting plate hermetically seals an opening of the fuel tank,
wherein the accommodating portion is disposed in an inner surface of the mounting plate that faces an inside of the fuel tank, and
wherein the filter case is integrally disposed on an outer surface of the mounting plate that is located outside the fuel tank to enable the heat exchange between the air passing through the filter case and the motor driver.

4. The fuel pump controller of claim 1, wherein the filter case includes:
a case body integrally connected to the mounting plate so that the filter sheet is disposed therein, the case body having an opening; and
a cover coupled to the case body to cover the opening and to hermetically seal an inner space of the case body.

5. The fuel pump controller of claim 1, wherein the air outlet port of the filter case is connected to an air port of a canister, which collects fuel evaporation gas, via a tube so that the air inside the air filter is suctioned into the airport through the air outlet port and the tube during a purge operation of the canister to separate of the fuel evaporation gas inside the canister.

6. The fuel pump controller of claim 1, wherein the filter sheet is horizontally disposed inside the filter case to vertically divide an inner space of the filter case.

7. The fuel pump controller of claim 1, further comprising:
a heat exchange case having a fuel inlet port for introduction of fuel returned from an engine and a fuel outlet port for discharge of the fuel, which has passed through the heat exchange case,
wherein the heat exchange case is coupled to the air filter to enable heat exchange between the fuel passing through the heat exchange case and the air passing through the air filter,
wherein the heat exchange case has a chamber shape, and
wherein at least a portion of an outer surface of the heat exchange case having the chamber shape is in contact with the air filter for transferring heat of the fuel passing through the heat exchange case.

8. The fuel pump controller of claim 7, wherein the heat exchange case is coupled and stacked on a top of the filter case of the air filter.

9. The fuel pump controller of claim 7, wherein the filter case is integrally connected to the mounting plate and has an opening, and
wherein the heat exchange case is coupled to the opening to hermetically seal an inner space of the filter case.

10. The fuel pump controller of claim 9, wherein:
the filter case has the opening in a top of the filter case; and
the heat exchange case is coupled and stacked on the top of the filter case so that a lower surface of the heat exchange case covers the opening in the filter case.

11. The fuel pump controller of claim 7, wherein the fuel returned from the engine is LPG fuel,
  wherein the fuel inlet port and the engine are connected to each other via a fuel return line so as to enable introduction of the LPG fuel returned from the engine, and
  wherein the fuel outlet port and an LPG bombe are connected to each other via the fuel return line so as to allow the LPG fuel, which has passed through the heat exchange case, to be returned to the LPG bombe.

* * * * *